(12) United States Patent
Lin

(10) Patent No.: US 12,471,130 B2
(45) Date of Patent: Nov. 11, 2025

(54) COMMUNICATION DEVICE AND METHOD OF SELECTING A BANDWIDTH

(71) Applicant: Realtek Semiconductor Corp., HsinChu (TW)

(72) Inventor: Po-Chuan Lin, HsinChu (TW)

(73) Assignee: Realtek Semiconductor Corp., HsinChu (TW)

( * ) Notice: Subject to any disclaimer, the term of this patent is extended or adjusted under 35 U.S.C. 154(b) by 359 days.

(21) Appl. No.: 17/897,215

(22) Filed: Aug. 28, 2022

(65) Prior Publication Data

US 2023/0124501 A1    Apr. 20, 2023

(30) Foreign Application Priority Data

Oct. 18, 2021    (TW) ................. 110138508

(51) Int. Cl.
*H04W 72/08*    (2009.01)
*H04W 24/08*    (2009.01)
*H04W 72/542*    (2023.01)

(52) U.S. Cl.
CPC ......... *H04W 72/542* (2023.01); *H04W 24/08* (2013.01)

(58) Field of Classification Search
CPC ............. H04W 24/08; H04W 72/0453; H04W 72/542; H04W 84/12
See application file for complete search history.

(56) References Cited

U.S. PATENT DOCUMENTS

2016/0249361 A1*  8/2016  Li ................. H04L 5/0064
2021/0329542 A1* 10/2021  Singh ............. H04W 48/16

FOREIGN PATENT DOCUMENTS

| EP | 4 102 925 A1 | 12/2022 |
|---|---|---|
| WO | 2006/069176 A2 | 6/2006 |
| WO | 2020/068566 A1 | 4/2020 |
| WO | 2021/185351 A1 | 9/2021 |

* cited by examiner

*Primary Examiner* — Mansour Oveissi
(74) *Attorney, Agent, or Firm* — Winston Hsu

(57) ABSTRACT

A first communication device capable of selecting a bandwidth, includes a receiving circuit, for receiving a wireless signal from a second communication device according to a first bandwidth; a measurement circuit, coupled to the receiving circuit, for measuring a communication quality of the wireless signal; and a processing circuit, coupled to the measurement circuit, for selecting a second bandwidth according to the first bandwidth and the communication quality; and a transmission circuit, coupled to the processing circuit, for transmitting information of the second bandwidth to the second communication device, for the second communication device to transmit the wireless signal to the first communication device according to the second bandwidth.

9 Claims, 6 Drawing Sheets

COMMUNICATION DEVICE AND METHOD OF SELECTING A BANDWIDTH

BACKGROUND OF THE INVENTION

1. Field of the Invention

The present invention relates to a communication device and a method used in a wireless communication system, and more particularly, to a communication device and a method of selecting a bandwidth to increase a throughput.

2. Description of the Prior Art

After a communication device is connected to a base station, a bandwidth is also fixed at the same time. The bandwidth is usually the highest bandwidth supported by the communication device, for the communication device to achieve the highest throughput. A higher bandwidth can indeed enable the communication device to obtain a higher throughput, when a signal strength is high. However, the higher bandwidth causes the communication device to obtain a lower throughput, when the signal strength is low.

Thus, how to enable the communication device to obtain a higher throughput under different signal strengths is an important problem to be solved.

SUMMARY OF THE INVENTION

The present invention therefore provides a communication device and a method for selecting a bandwidth according to a communication quality to solve the above mentioned problem.

A first communication device capable of selecting a bandwidth comprises a receiving circuit, for receiving a wireless signal from a second communication device according to a first bandwidth; a measurement circuit, coupled to the receiving circuit, for measuring a communication quality of the wireless signal; a processing circuit, coupled to the measurement circuit, for selecting a second bandwidth according to the first bandwidth and the communication quality; and a transmission circuit, coupled to the processing circuit, for transmitting information of the second bandwidth to the second communication device, for the second communication device to transmit the wireless signal to the first communication device according to the second bandwidth.

A method of selecting a bandwidth for a first communication device comprises receiving a wireless signal from a second communication device according to a first bandwidth; measuring a communication quality of the wireless signal; selecting a second bandwidth according to the first bandwidth and the communication quality; and transmitting information of the second bandwidth to the second communication device, for the second communication device to transmit the wireless signal to the first communication device according to the second bandwidth.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
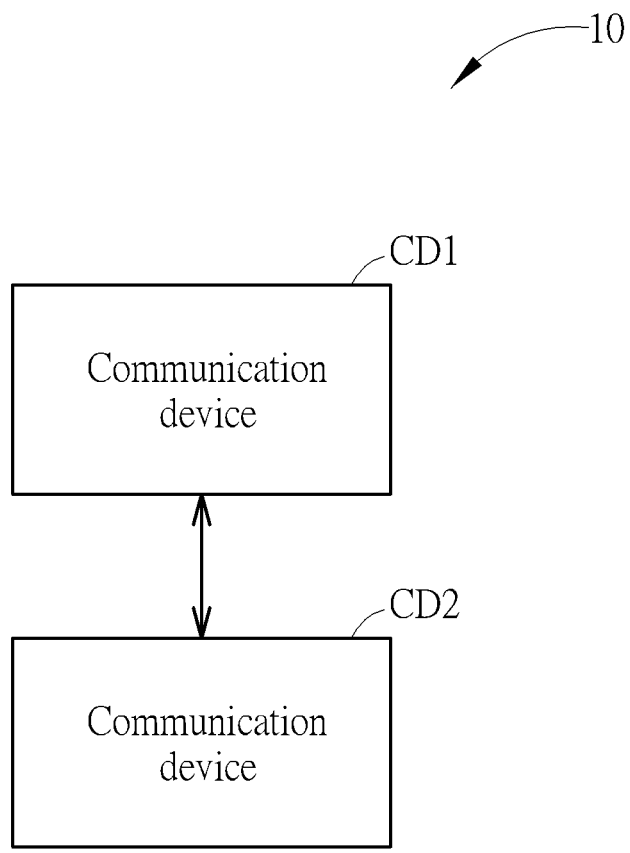
FIG. 1 is a schematic diagram of a wireless communication system according to an example of the present invention.

FIG. 1 is a schematic diagram of a communication system 10 according to an example of the present invention. The communication system 10 may be any communication system using orthogonal frequency-division multiplexing (OFDM) technology (or discrete multi-tone modulation (DMT) technology) or other communication technologies, which is simply composed of a communication device CD1 and a communication device CD2. In FIG. 1, the communication device CD1 and the communication device CD2 are utilized for illustrating the structure of the communication system 10. For example, the communication system 10 maybe any wireless communication system such as a wireless local area network (WLAN), a Digital Video Broadcasting (DVB) system, a Long Term Evolution (LTE) system, a Long Term Evolution-advanced (LTE-A) system or a 5th generation (5G) system. The WLAN can comply with the standards of IEEE 802.11b, IEEE 802.11g, IEEE 802.11n, IEEE 802.11ac, IEEE 802.11ad, IEEE 802.11af, IEEE 802.11ax, etc., or the subsequent versions of these versions, and is not limited herein.

For example, the communication device CD1 (or the communication device CD2) may be a user equipment (UE), a low cost device (e.g., machine type communication (MTC) device), a device-to-device (D2D) communication device, a narrow-band internet of things (IoT) (NB-IoT) device, a mobile phone, a laptop, a tablet computer, an electronic book, a portable computer system, a computer, a server, or combination thereof. The communication device CD2 (or the communication device CD1) may be a base station in a mobile network, an access point (AP) in a WLAN, or other wireless communication devices, and is not limited herein.

Figure 2:
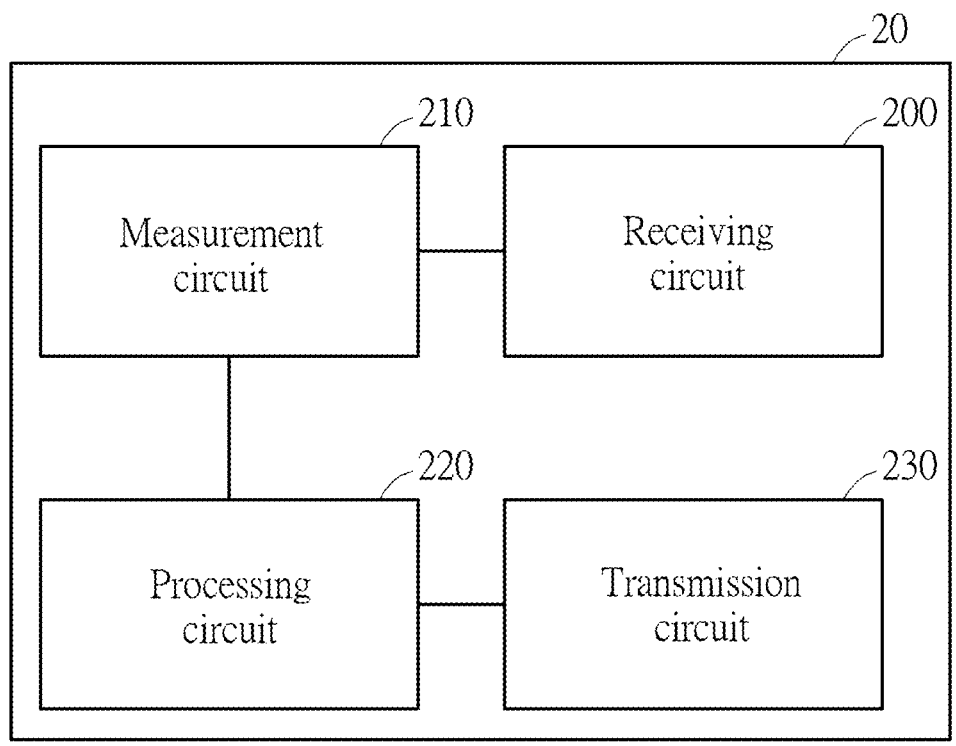
FIG. 2 is a schematic diagram of a communication device according to an example of the present invention.

FIG. 2 is a schematic diagram of a communication device 20 according to an example of the present invention, for implementing the communication device CD1 of FIG. 1, to perform wireless communication with another communication device. For the ease of the description, the communication device CD1 (the communication device 20) and the communication device CD2 (the other communication device) are taken an example to illustrate the operation of the communication device 20. The communication device CD1 includes a receiving circuit 200, a measurement circuit 210, a processing circuit 220, and a transmission circuit 230. The receiving circuit 200 receives a wireless signal (e.g., a packet) from the communication device CD2 according to a first bandwidth. The measurement circuit 210 is coupled to the receiving circuit 200, for measuring (e.g., detecting, monitoring) a communication quality (e.g., a signal strength) of the wireless signal. The processing circuit 220 is coupled to the measurement circuit 210, for selecting a second bandwidth according to the first bandwidth and the communication quality. The transmission circuit 230 is coupled to the processing circuit 220, for transmitting information of the second bandwidth to the communication device CD2, for the communication device CD2 to transmit the wireless signal to the communication device CD1 according to the second bandwidth. That is, the communication device CD1 determines a bandwidth to be used according to a current bandwidth and a current communication quality, and notifies the communication device CD2 to use the new bandwidth to transmit a wireless signal to the communication device CD1. In other words, according to the communication quality, the communication device CD1 indicates the communication device CD2 to use a different bandwidth (e.g., the highest bandwidth) for performing wireless communication. Thus, the present invention solves the problem caused by using a fixed bandwidth, and improves a throughput of a communication device. In addition, in the case of a lower communication quality (e.g., longer distance), the present invention can still maintain the wireless communication in a connected state.

For example, the information with the second bandwidth may be included in a high throughput (HT) action frame defined by IEEE 802.11n, such as a Notify Channel Width frame. The communication device CD1 can use a channel width field in the Notify Channel Width frame to notify the communication device CD2 to change the current bandwidth. For example, the information with the second bandwidth may be included in a very high throughput (VHT) action frame defined by IEEE 802.11ac, e.g., an Operating Mode Notification frame. The communication device CD1 may use an Operation Mode field in the Operating Mode Notification frame to notify the communication device CD2 to change the current bandwidth. For example, the information with the second bandwidth may be included in other packet (s) defined by IEEE 802.11ac, e.g., an Operating Mode Notification element. The communication device CD1 may use an Operating Mode field in the Operating Mode Notification element to notify the communication device CD2 to change the current bandwidth. For example, the information with the second bandwidth may be included in an Operating Mode Control subfield defined by IEEE 802.11ax. The communication device CD1 may use the Operating Mode Control subfield to notify the communication device CD2 to change the current bandwidth.

It should be noted that the examples may be applied to IEEE 802.11 standard(s) newly developed in the future, and is not limited herein. The information mentioned above utilized to notify the communication device CD2 may be (or be transmitted in) "a changing bandwidth notification message/packet".

In one example, the communication device CD1 is connected to the communication device CD2 according to an initial bandwidth, and the processing circuit 220 selects the second bandwidth according to the first bandwidth, the initial bandwidth and the communication quality. That is, the communication device CD1 also considers the initial bandwidth used in establishing the connection, when the communication device CD1 selects the second bandwidth. In one example, the communication quality is smaller than a first value, and the second bandwidth is smaller than the first bandwidth. That is, the communication device CD1 selects a smaller bandwidth to perform communication, when the communication quality is poor. In one example, the communication quality is greater than a second value, and the second bandwidth is greater than the first bandwidth. That is, the communication device CD1 selects a greater bandwidth to perform communication, when the communication quality is better.

In one example, the communication quality includes a received signal strength indication (RSSI). In one example, the wireless signal complies with at least one version of an IEEE 802.11 standard, e.g., IEEE 802.11n, IEEE 802.11ac, IEEE 802.11ax and other versions. That is, the communication device CD1 and the communication device CD2 may perform the wireless communication according to any of the wireless communication standards mentioned above. In one example, the second communication device is an access point (AP).

In one example, the first bandwidth is 20 MHz, 40 MHz, 80 MHz or 160 MHz. In one example, the second bandwidth is 20 MHz, 40 MHz, 80 MHz or 160 MHz.

Several examples are described below to illustrate operations of the communication device CD1.

Figure 3:
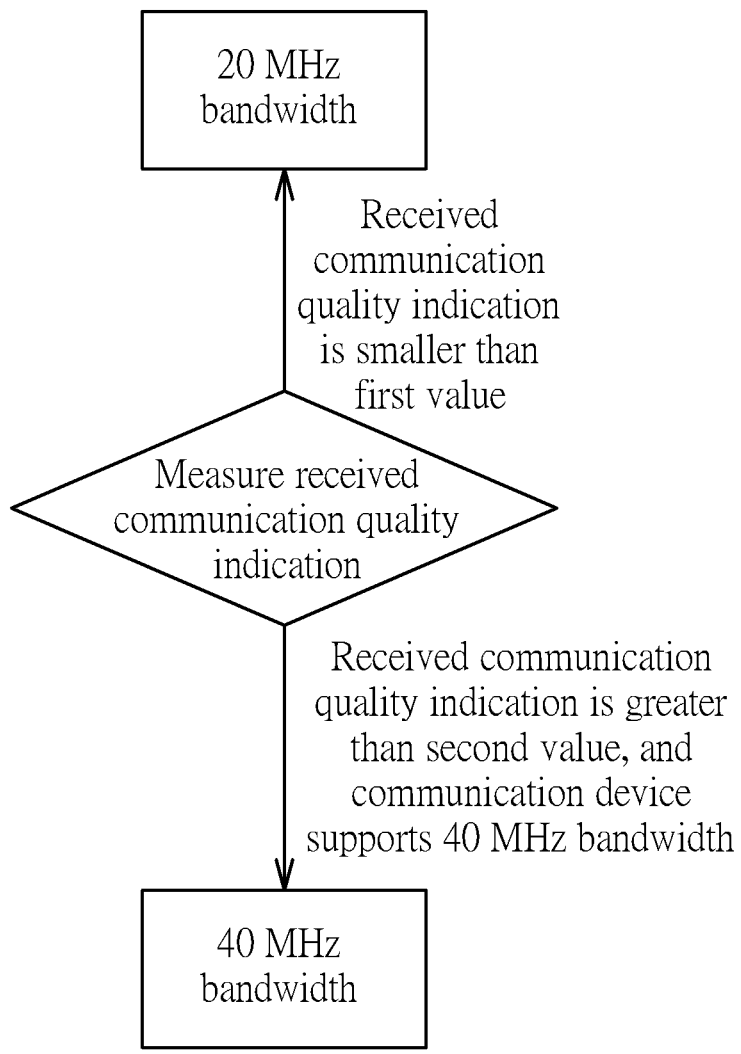
FIG. 3 is a schematic diagram of changing a bandwidth according to an example of the present invention.

FIG. 3 is a schematic diagram of changing a bandwidth according to an example of the present invention. The communication device CD1 is connected to the communication device CD2 with a 40 MHz bandwidth, and the communication device CD1 measures a received communication quality indication. When the received communication quality indication is smaller than a first value (e.g., −70 dbm) (e.g., when the communication device CD1 is far away from the communication device CD2), the communication device CD1 selects a 20 MHz bandwidth, and transmits information of 20 MHz to the communication device CD2, to notify the communication device CD2 to reduce the bandwidth to 20 MHz. When the received communication quality indication is greater than a second value (e.g., −60 dbm) (e.g., when the communication device CD1 is close to the communication device CD2), and the communication device CD2 supports a 40 MHz bandwidth, the communication device CD1 selects a 40 MHz bandwidth, and transmits information of 40 MHz to the communication device CD2, to notify the communication device CD2 to increase the bandwidth to 40 MHz.

Figure 4:
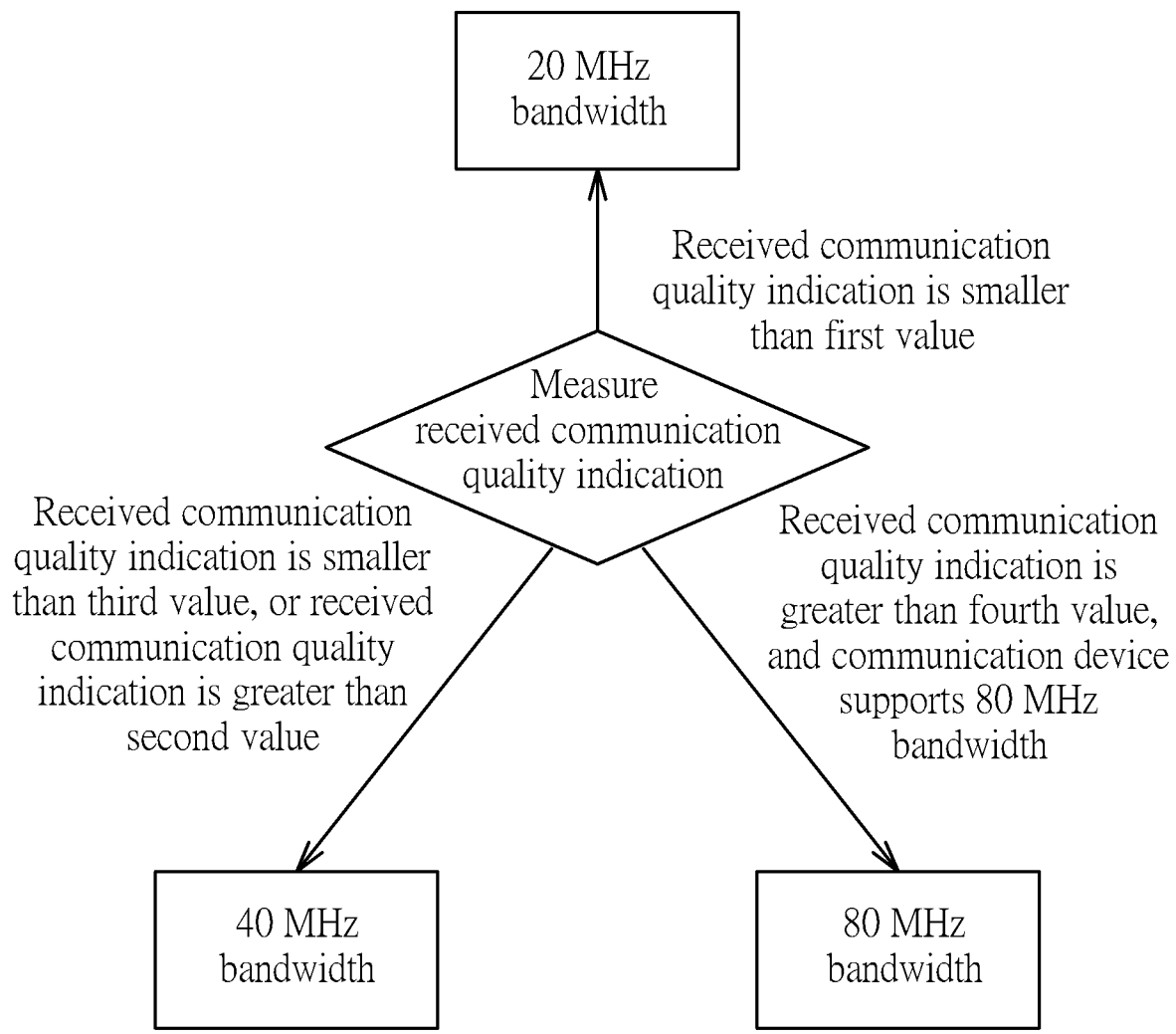
FIG. 4 is a schematic diagram of changing a bandwidth according to an example of the present invention.

FIG. 4 is a schematic diagram of changing a bandwidth according to an example of the present invention. The communication device CD1 is connected to the communication device CD2 with an 80 MHz bandwidth, and the communication device CD1 measures a received communication quality indication. When the received communication quality indication is smaller than a third value (e.g., −67 dbm) (e.g., when the communication device CD1 is far away from the communication device CD2), the communication device CD1 selects a 40 MHz bandwidth, and transmits information of 40 MHz to the communication device CD2, to notify the communication device CD2 to reduce the bandwidth to 40 MHz. When the received communication quality indication is smaller than the first value (e.g., −70 dbm), the communication device CD1 selects a 20 MHz bandwidth, and transmits information of 20 MHz to the communication device CD2, to notify the communication device CD2 to reduce the bandwidth to 20 MHz.

When the received communication quality indication is greater than the second value (e.g., −60 dbm) (e.g., when the communication device CD1 is close to the communication device CD2), the communication device CD1 selects a 40 MHz bandwidth, and transmits information of 40 MHz to the communication device CD2, to notify the communication device CD2 to increase the bandwidth to 40 MHz. When the received communication quality indication is greater than a fourth value (e.g., −57 dbm) (e.g., when the communication device CD1 is close to the communication device CD2), and the communication device CD2 supports a 80 MHz bandwidth, the communication device CD1 selects a 80 MHz bandwidth, and transmits information of 80 MHz to the communication device CD2, to notify the communication device CD2 to increase the bandwidth to 80 MHz. Because the initial connection bandwidth is 80 MHz, the communication device CD1 only notifies the communication device CD2 to increase the bandwidth to 80 MHz, i.e., the communication device CD1 do not notify the communication device CD2 to increase the bandwidth to 160 MHz for a better communication quality.

It should be noted that when the communication device CD1 performs communication (transmits/receives a wireless signal) with the communication device CD2 with a 20 MHz bandwidth, the communication device may select a 40 MHz bandwidth or a 80 MHz bandwidth according to the received communication quality indication. When the communication device CD1 performs communication (transmits/receives a wireless signal) with the communication device CD2 with a 80 MHz bandwidth, the communication device CD1 may select a 20 MHz bandwidth or 40 MHz bandwidth according to the received communication quality indication. That is, an amplitude of a change of the bandwidth is variable and does not need to be fixed.

Figure 5:
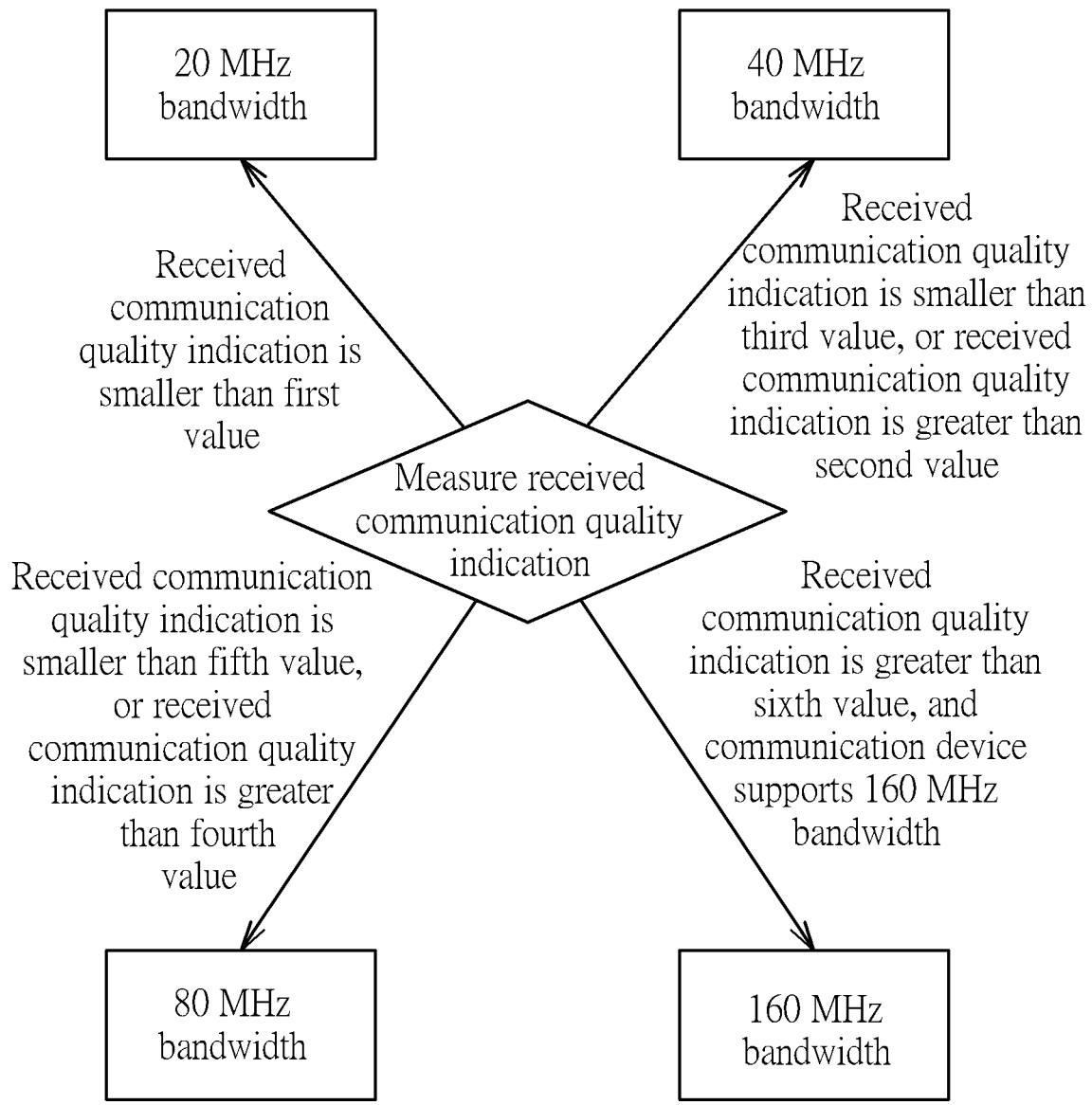
FIG. 5 is a schematic diagram of changing a bandwidth according to an example of the present invention.

FIG. 5 is a schematic diagram of changing a bandwidth according to an example of the present invention. The communication device CD1 is connected to the communication device CD2 with a 160 MHz bandwidth, and the communication device CD1 measures a received communication quality indication. When the received communication quality indication is smaller than a fifth value (e.g., −64 dbm) (e.g., when the communication device CD1 is far away from the communication device CD2), the communication device CD1 selects a 80 MHz bandwidth, and transmits information of 80 MHz to the communication device CD2, to notify the communication device CD2 to reduce the bandwidth to 80 MHz. When the received communication quality indication is smaller than the third value (e.g., −67 dbm), the communication device CD1 selects a 40 MHz bandwidth, and transmits information of 40 MHz to the communication device CD2, to notify the communication device CD2 to reduce the bandwidth to 40 MHz. When the received communication quality indication is smaller than the first value (e.g., −70 dbm) (e.g., when the communication device CD1 is far away from the communication device CD2), the communication device CD1 selects a 20 MHz bandwidth, and transmits information of 20 MHz to the communication device CD2, to notify the communication device CD2 to reduce the bandwidth to 20 MHz.

When the received communication quality indication is greater than the second value (e.g., −60 dbm) (e.g., when the communication device CD1 is close to the communication device CD2), the communication device CD1 selects a 40 MHz bandwidth, and transmits information of 40 MHz to the communication device CD2, to notify the communication device CD2 to increase the bandwidth to 40 MHz. When the received communication quality indication is greater than the fourth value (e.g., −57 dbm) (e.g., when the communication device CD1 is close to the communication device CD2), the communication device CD1 selects a 80 MHz bandwidth, and transmits information of 80 MHz to the communication device CD2, to notify the communication device CD2 to increase the bandwidth to 80 MHz. When the received communication quality indication is greater than a sixth value (e.g., −54 dbm) (e.g., when the communication device CD1 is close to the communication device CD2), and the communication device CD2 supports a 160 MHz bandwidth, the communication device CD1 selects a 160 MHz bandwidth, and transmits information of 160 MHz to the communication device CD2, to notify the communication device CD2 to increase the bandwidth to 160 MHz. Because the initial connection bandwidth is 160 MHz, the communication device CD1 only notifies the communication device CD2 to increase the bandwidth to 160 MHz, and do not notify the communication device CD2 to further increase the bandwidth for a better communication quality.

It should be noted that when the communication device CD1 performs communication (transmits/receives a wireless signal) with the communication device CD2 with a 20 MHz bandwidth, the communication device CD1 may select a 40 MHz bandwidth, a 80 MHz bandwidth or a 160 MHz bandwidth according to the received communication quality indication. When the communication device CD1 performs communication (transmits/receives a wireless signal) with the communication device CD2 with a 40 MHz bandwidth, the communication device CD1 may select a 20 MHz bandwidth, a 80 MHz bandwidth or a 160 MHz bandwidth according to the received communication quality indication. When the communication device CD1 performs communication (transmits/receives a wireless signal) with the communication device CD2 with a 80 MHz bandwidth, the communication device CD1 may select a 20 MHz bandwidth, a 40 MHz bandwidth or a 160 MHz bandwidth according to the received communication quality indication. That is, an amplitude of a change of the bandwidth is variable and does not need to be fixed.

When measuring a communication quality, a low attenuation may be slowly increased to a high attenuation to simulate a usage scenario of the communication device CD1 moving gradually away from the communication device CD2 (i.e., longer distance). Thus, the communication quality measured by the communication device CD1 for performing a test gradually changes from strong to weak. If an initial bandwidth for a connection used by the communication device CD1 is a higher than 40 MHz, 80 MHz or 160 MHz when the communication device CD1 has a better communication quality, a throughput of a higher bandwidth is better than a throughput of a lower bandwidth (e.g., 20 MHz). Conversely, when the communication device CD1 has a poor communication quality, a throughput of a lower bandwidth (e.g., 20 MHz) is better than a throughput of a higher bandwidth. When the communication device CD1 has a very poor communication quality, a higher bandwidth (e.g., 80 MHz) may be disconnected earlier than a lower bandwidth (e.g., 20 MHz).

From another point of view, if an initial bandwidth used for a connection of the communication device CD1 is a lower bandwidth of 20 MHz, a throughput of a higher bandwidth (e.g., 40 MHz, 80 MHz or 160 MHz) is better than a throughput of a lower bandwidth when the communication device CD1 has a better communication quality. Conversely, not only the throughput of the lower bandwidth is better than the throughput of the higher bandwidth but also the lower bandwidth has a higher probability of maintaining the communication, when the communication device CD1 has a poor communication quality.

According to the above examples, the communication device CD1 may determine a bandwidth to be used (e.g., 20 MHz, 40 MHz, 80 MHz or 160 MHz) according to an initial bandwidth, a current connection bandwidth and a communication quality. The above principle can be applied to a bandwidth greater than 160 MHz.

Figure 6:
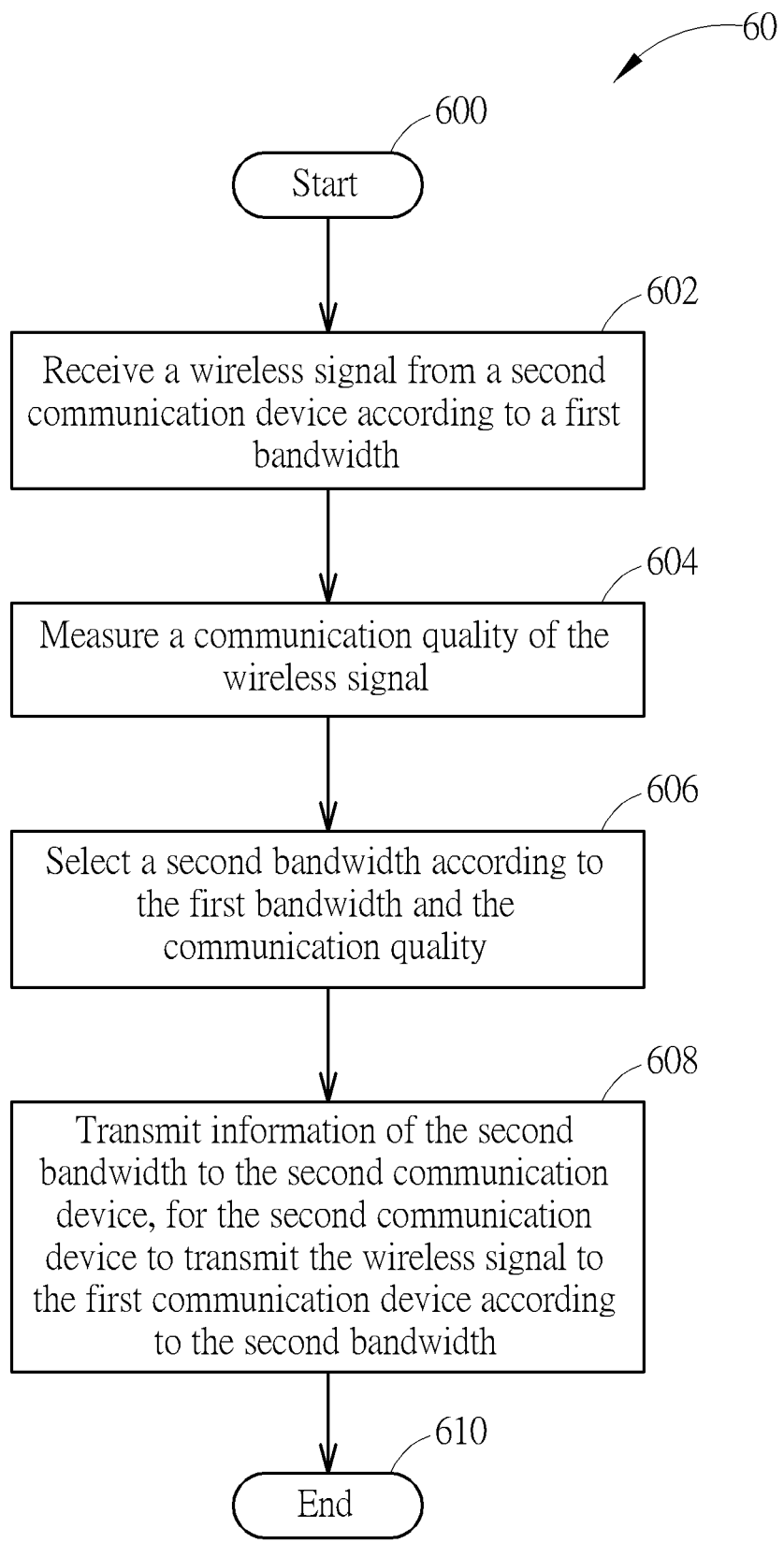
FIG. 6 is a flowchart of a process according to an example of the present invention.

The abovementioned operations of the communication device CD1 can be summarized into a process 60, for implementing the communication device 20, as shown in FIG. 6. The process 60 includes the following steps:

Step 600: Start.

Step 602: Receive a wireless signal from a second communication device according to a first bandwidth.

Step 604: Measure a communication quality of the wireless signal.

Step 606: Select a second bandwidth according to the first bandwidth and the communication quality.

Step 608: Transmit information of the second bandwidth to the second communication device, for the second communication device to transmit the wireless signal to the first communication device according to the second bandwidth.

Step 610: End.

It should be noted that the communication device 20 (and the receiving circuit 200, the measurement circuit 210, the processing circuit 220 and the transmission circuit 230 therein) can be implemented in various ways, e.g., implemented by hardware (e.g., a circuit). For example, the circuits mentioned above may be integrated into one or more circuits. In addition, the communication device 20 can be implemented by means that could be hardware, software, firmware (known as a combination of a hardware device and computer instructions and data that reside as read-only software on the hardware device), an electronic system, or combination thereof, and is not limited herein.

To sum up, the present invention provides a communication device and a method for handling wireless communication. The communication device can select a bandwidth to be used based on a current bandwidth and a communication quality, instead of using a fixed bandwidth for the wireless communication. Thus, the present invention solves the problems caused by using the fixed bandwidth and improves a throughput of the communication device.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A first communication device capable of selecting a bandwidth, comprising:
a receiving circuit, configured to receive a wireless signal from a second communication device according to a first bandwidth, wherein the second communication device initially communicates with the first communication device over an initial bandwidth different from the first bandwidth;
a measurement circuit, coupled to the receiving circuit, the measurement device configured to measure a communication quality of the wireless signal;
a processing circuit, coupled to the measurement circuit, the processing device configured to select a second bandwidth according to the initial bandwidth, the first bandwidth and the communication quality, wherein the communication quality is compared to a plurality of values, when the communication quality is less than a first value, the second bandwidth is selected to be smaller than the first bandwidth, and when the communication quality is more than a second value, the second bandwidth is selected to be greater than the first bandwidth; and
a transmission circuit, coupled to the processing circuit, the transmission device configured to transmit information of the second bandwidth to the second communication device, and the second communication device transmits the wireless signal to the first communication device according to the second bandwidth;
wherein the second bandwidth does not exceed the initial bandwidth.

2. The first communication device of claim 1, wherein the communication quality is less than the first value and the second bandwidth is selected to be 20 MHz;
wherein when the communication quality is measured again and determined to be greater than the first value and smaller than a third value, the second bandwidth is selected to be 40 MHz;
wherein when the communication quality is measured again and determined to be greater than the third value and smaller than a fourth value, the second bandwidth is selected to be 80 MHz.

3. The first communication device of claim 1, wherein the communication quality is greater than the second value and the second bandwidth is selected to be 160 MHz;
wherein when the communication quality is measured again and determined to be less than the second value and greater than a third value, the second bandwidth is selected to be 80 MHz;
wherein when the communication quality is measured again and determined to be greater than the first value and smaller than the third value, the second bandwidth is selected to be 40 MHz.

4. The first communication device of claim 1, wherein the communication quality comprises a received signal strength indication (RSSI).

5. The first communication device of claim 1, wherein the wireless signal complies with at least one version of an IEEE 802.11 standard.

6. The first communication device of claim 1, wherein the second communication device is an access point (AP).

7. The first communication device of claim 1, wherein the first bandwidth is 20 MHz, 40 MHz, 80 MHz or 160 MHz.

8. The first communication device of claim 1, wherein the second bandwidth is 20 MHz, 40 MHz, 80 MHz or 160 MHz.

9. A method of selecting a bandwidth for a first communication device, comprising:
receiving a wireless signal from a second communication device according to a first bandwidth, wherein the second communication device initially communicates with the first communication device over an initial bandwidth different from the first bandwidth;
measuring a communication quality of the wireless signal;
selecting a second bandwidth according to the initial bandwidth, the first bandwidth and the communication quality, wherein the communication quality is compared to a plurality of values, when the communication quality is less than a first value, the second bandwidth is selected to be smaller than the first bandwidth, and when the communication quality is more than a second value, the second bandwidth is selected to be greater than the first bandwidth; and
transmitting information of the second bandwidth to the second communication device, for the second communication device to transmit the wireless signal to the first communication device according to the second bandwidth;
wherein the second bandwidth does not exceed the initial bandwidth.

* * * * *